(12) United States Patent
Runstedler et al.

(10) Patent No.: US 9,547,731 B2
(45) Date of Patent: Jan. 17, 2017

(54) MERGING SETS OF DATA OBJECTS FOR DISPLAY

(71) Applicant: BlackBerry Limited, Waterloo (CA)

(72) Inventors: Christopher James Runstedler, Cambridge (CA); Aaron David Scriver, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 321 days.

(21) Appl. No.: 13/940,435

(22) Filed: Jul. 12, 2013

(65) Prior Publication Data
US 2015/0019552 A1    Jan. 15, 2015

(51) Int. Cl.
*G06F 17/30* (2006.01)

(52) U.S. Cl.
CPC ... *G06F 17/30994* (2013.01); *G06F 17/30126* (2013.01)

(58) Field of Classification Search
CPC ............ G06F 17/30126; G06F 17/3028; G06F 17/30994
See application file for complete search history.

(56) References Cited

U.S. PATENT DOCUMENTS

| 5,412,808 A * | 5/1995 | Bauer ............... G06F 17/30179 707/822 |
| 8,972,453 B2 * | 3/2015 | Wu .................... G06F 17/30091 707/758 |
| 2002/0055932 A1 * | 5/2002 | Wheeler ........... G06F 17/30557 707/999.104 |
| 2003/0076322 A1 | 4/2003 | Ouzts et al. |
| 2005/0131902 A1 * | 6/2005 | Saika .............................. 707/10 |
| 2005/0192918 A1 * | 9/2005 | DeLorme .......... G06F 17/30067 707/999.001 |
| 2010/0262638 A1 | 10/2010 | Fitzgerald |
| 2013/0117692 A1 | 5/2013 | Padmanabhan et al. |

OTHER PUBLICATIONS

Stackoverflow, "How to get only the last part of a path in Python?", online forum discussion, Oct. 13, 2010, 2 pages.*
EPO, Extended European Search Report relating to EP Application No. 13176257.7, dated Dec. 5, 2013.
Collins-Sussman, B. et al., "Advance Merging", Version Control with Subversion (for Subversion 1.7), pp. 1-16, svnbook.red-bean.com/en/1.7/svn.branchmerge.advanced.html, Jun. 21, 2013.

(Continued)

*Primary Examiner* — Scott A Waldron
(74) *Attorney, Agent, or Firm* — Rowand LLP

(57) ABSTRACT

Disclosed is a method of merging a first set of data objects and a second set of data objects for displaying on a display screen, the method comprising: retrieving a first identifier associated with a first memory location, the first memory location for storing the first set of data objects; retrieving a second identifier associated with a second memory location, the second memory location for storing the second set of data objects; comparing the first identifier and the second identifier; and grouping one or more first data objects from the first set of data objects and one or more second data objects from the second set of data objects based on the comparison.

18 Claims, 3 Drawing Sheets

(56) References Cited

OTHER PUBLICATIONS

Collins-Sussman, B. et al., "Basic Merging", Version Control with Subversion (for Subversion 1.7), pp. 1-17, svnbook.red-bean.com/en/1.7/svn.branchmerge.basicmerging.html#svn.branchemerge.basicmerging.stayinsync.subtree, Jun. 21, 2013.
Trapani, G., "Compare and merge files and folders with WinMerge (http://lifehacker.com/290657/compare-andmerge-files-and-folders-with-winmerge)", Gawker Media 2013, pp. 1-4, Jun. 21, 2013.
Altova, "Folder Differencing", www.altova.com/diffdog/folder-diff-tool.html, pp. 1-2, Jun. 21, 2013.
GIT, "GIT—Subtree Merging", git-scm.com/booklch6-7.html, pp. 1-5, Jun. 21, 2013.
Dube, R., How to Merge Duplicate Files and Folders with WinMerge, www.makeuseof.com/tag/merge-duplicate-files-folders-winmerge/ 2/, pp. 1-6, Jun. 3, 2010.
Araxis LTD., "Overview of Merge for Windows | File Comparison, Merging & More", www.araxis.com/merge/, pp. 1-4, Jun. 21, 2013.
Stackoverflow, "Using git to merge two directories with common parent (but different SHA1)", stackoverflow.com/questions/14253594/using-git-to-merge-two-directories-with-common-parent-but-different-sha1 1/, pp. 1-4, Jun. 21, 2013.

* cited by examiner

MERGING SETS OF DATA OBJECTS FOR DISPLAY

FIELD

The present matter is related to storing data objects and in particular to merging a first set of data objects and a second set of data objects for displaying on a display screen.

BACKGROUND

Electronic devices, such as mobile communication devices, computers, tablets or other electronic devices are often used to store data such as camera images, video files and digital audio files. Such data can often be stored in more than one location. For example, such data can be stored in memory that is local to the electronic device and similar data can be stored in a removable memory, such as a flash memory.

The operation of electronic devices can be enhanced in various ways depending on how the data is displayed on a display screen.

BRIEF DESCRIPTION OF DRAWINGS

In order that the subject matter may be readily understood, embodiments are illustrated by way of examples in the accompanying drawings, in which.

DETAILED DESCRIPTION

In accordance with an aspect described is a method of merging a first set of data objects and a second set of data objects for displaying on a display screen, the method comprising: retrieving a first identifier associated with a first memory location, the first memory location for storing the first set of data objects; retrieving a second identifier associated with a second memory location, the second memory location for storing the second set of data objects; comparing the first identifier and the second identifier; and grouping one or more first data objects from the first set of data objects and one or more second data objects from the second set of data objects based on the comparison.

In accordance with another aspect, disclosed is an electronic device comprising: a first memory location for storing a first set of data objects; a second memory location for storing a second set of data objects; a processor for executing instructions; and a memory for storing the instructions, which when executed cause the processor to: retrieve a first identifier associated with the first memory location; retrieve a second identifier associated with the second memory location; compare the first identifier and the second identifier; and group one or more first data objects from the first set of data objects and one or more second data objects from the second set of data objects based on the comparison.

In accordance with another aspect, disclosed is a computer readable memory comprising computer-executable instructions which, when executed, cause a processor to: retrieve a first identifier associated with a first memory location, the first memory location for storing a first set of data objects; retrieve a second identifier associated with a second memory location, the second memory location for storing a second set of data objects; compare the first identifier and the second identifier; and group one or more first data objects from the first set of data objects and one or more second data objects from the second set of data objects based on the comparison.

Often data files or data objects are stored on more than one memory. For example, image files that may have been captured with a camera or downloaded from one or more remote sources or received via a data communication message may be stored in two separate memories. For instance, some image files may be stored on an electronic device's local memory and some image files may be stored on a removable memory (such as a flash memory). When accessing the image files (or other types of data objects) it may be useful to view similar image files from the two memories as a single presentation or list of image files.

The present matter discloses displaying a list or presenting the images from multiple memories on a single display screen. The images (or other data objects) may be presented without regard to the fact that the underlying files are located in separate memories.

Example Communication Device

Figure 1:
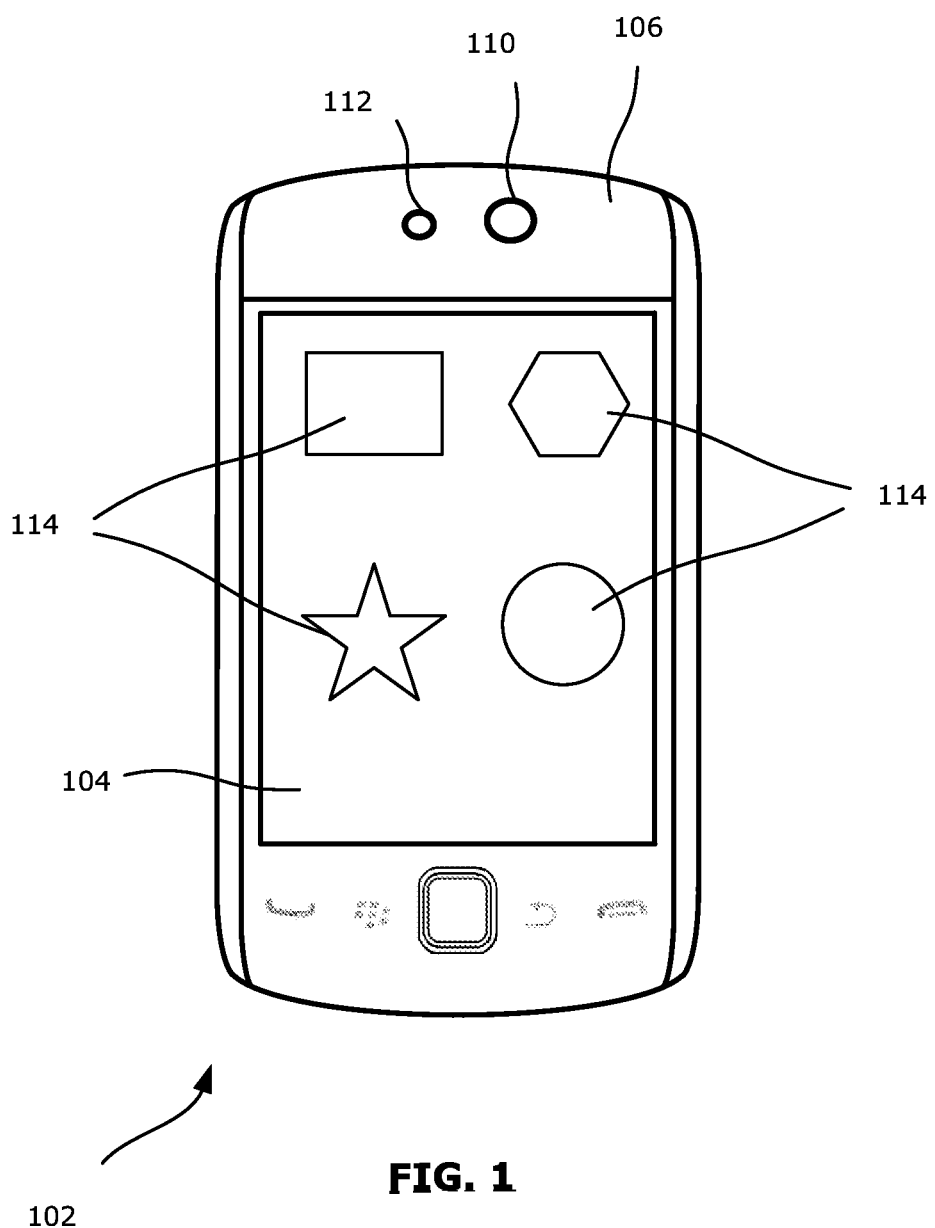
FIG. 1 is a front elevation view of an example electronic device in accordance with example embodiments of the present disclosure.

Referring first to FIG. 1, a front view of an example electronic device 102 is illustrated. The electronic device can be a mobile phone, portable computer, smartphone, tablet computer, personal digital assistant, a wearable computer such as a watch, a television, a digital camera or a computer system, for example. The electronic device 102 may be of a form apart from those specifically listed above.

FIG. 1 illustrates a front view of the electronic device 102. The front view of the electronic device 102 illustrates a front face 106 of the electronic device 102. The front face 106 of the electronic device 102 is a side of the electronic device 102 that includes a main display screen 104 of the electronic device 102. The front face 106 of the electronic device 102 is a side of the electronic device 102 that is configured to be viewed by a user.

The electronic device 102 can include one or more cameras 110. The cameras 110 are configured to generate camera media, such as images in the form of still photographs, motion video or another type of camera data. The camera media may be captured in the form of an electronic signal which is produced by an image sensor associated with the camera 110. Components other than the image sensor may be associated with the camera 110, although such other components may not be shown in the Figures. More particularly, the image sensor (not shown) is configured to produce an electronic signal in dependence on received light. That is, the image sensor converts an optical image into an electronic signal, which may be output from the image sensor by way of one or more electrical connectors associated with the image sensor. The electronic signal represents electronic image data (which may also be referred to as camera media or camera data).

Images captured by the camera 110 can be stored as data (or data objects) in a memory associated with the electronic device 102.

The display screen 104 can be configured to display visual identifiers 114 such as images, videos or icons. The visual identifiers 114 can be stored in a memory associated with the electronic device 102. Alternatively, the display screen 104 can display the view captured using the camera 110. The visual identifiers 114 shown in FIG. 1 are a rectangle, a hexagon, a star and a circle. However, the visual identifiers 114 can, alternatively, be thumbnails (i.e. smaller sized images) or icons representative of an underlying data object. The visual identifiers 114 may otherwise or additionally be text or text-based.

In one or more embodiments, each visual identifier 114 is associated with an underlying data object. For example, the data object that underlies a visual identifier 114 can be an image, an audio file or a video file.

A visual identifier 114 may be selected using an input interface. For example, a visual identifier 114 may be selected using a touchscreen input in an embodiment in which the display screen 104 is a touchscreen display. By way of further example, a visual identifier 114 may be selected using a trackball or other input interface. After a visual identifier 114 is selected, the underlying data object may be displayed on the display screen 104. For example, a particular visual identifier 114 may have an image file as its underlying data object. Upon selection of that particular visual identifier 114, the image file may be displayed on the display screen in place of all of the visual identifiers 114.

There may be zero, one or more visual identifiers 114 displayed on the display screen 104 at any time. In one or more embodiments, a list of visual identifiers 114 may be displayed on the display screen in response to a predefined or specific input. For example, the selection of a folder of data objects (e.g. a folder of image files) may result in the display of visual identifiers 114 (e.g. thumbnails) representing each data object in the selected folder.

The visual identifiers 114 may be displayed in an ordered way on the display screen 104 in accordance with one or more features of the underlying data object or with one or more features of the visual identifiers 114. For example, the data objects that underlie (or that are associated with) the visual identifiers 114 may have a time-stamp or date-stamp. That is the data objects may be associated with a time or date of creation. In accordance with an embodiment, when the visual identifiers 114 are displayed on the display screen 104 they may be displayed in chronological order (i.e. ordered according to the time or date of creation). Other features of the visual identifiers 114 or data object that can be used to organize or order the display of the visual identifiers 114 on the display screen 104 can include the size of the data object, the size of the visual identifier 114, the number of colours on the visual identifier 114, or the number of times the visual identifier 114 or underlying data object has been accessed, for example.

In the embodiment illustrated, the electronic device 102 includes a front facing camera 110. A front facing camera is a camera 110 which is located to obtain images of a subject near a front face 106 of the electronic device 102. That is, the front facing camera may be located on or near a front face 106 of the electronic device 102. By way of further example, a front facing camera 110 may face the same direction as the main display screen 104. In at least some example embodiments, the front facing camera may be provided in a central location relative to the display screen 104 to facilitate image acquisition of a face. In at least some embodiments, the front facing camera may be used, for example, to allow a user of the electronic device 102 to engage in a video-based chat with a user of another electronic device 102. In at least some embodiments, the front facing camera is mounted internally within a housing of the electronic device 102 beneath a region of the front face 106 which transmits light. For example, the front facing camera may be mounted beneath a clear portion of the housing which allows light to be transmitted to the internally mounted camera. In other embodiments (not illustrated), the electronic device 102 may include a rear facing camera instead of or in addition to the front facing camera.

The electronic device 102 includes a flash 112. The flash 112 may, in at least some embodiments, be a light emitting diode (LED) flash. The flash 112 emits electromagnetic radiation. More particularly, the flash 112 may be used to produce a brief bright light which may facilitate picture-taking in low light conditions. That is, the flash 112 may emit light while an image is captured using the camera 110. In the embodiment illustrated, the flash 112 is located to emit light at the front face 106 of the electronic device 102. That is, the flash is a front-facing flash in the illustrated embodiment. The electronic device 102 may include a rear-facing flash instead of or in addition to the rear facing flash to emit light at the front face 106 of the electronic device 102. The electronic device 102 may have additional camera hardware which may complement the camera 110.

Figure 2:
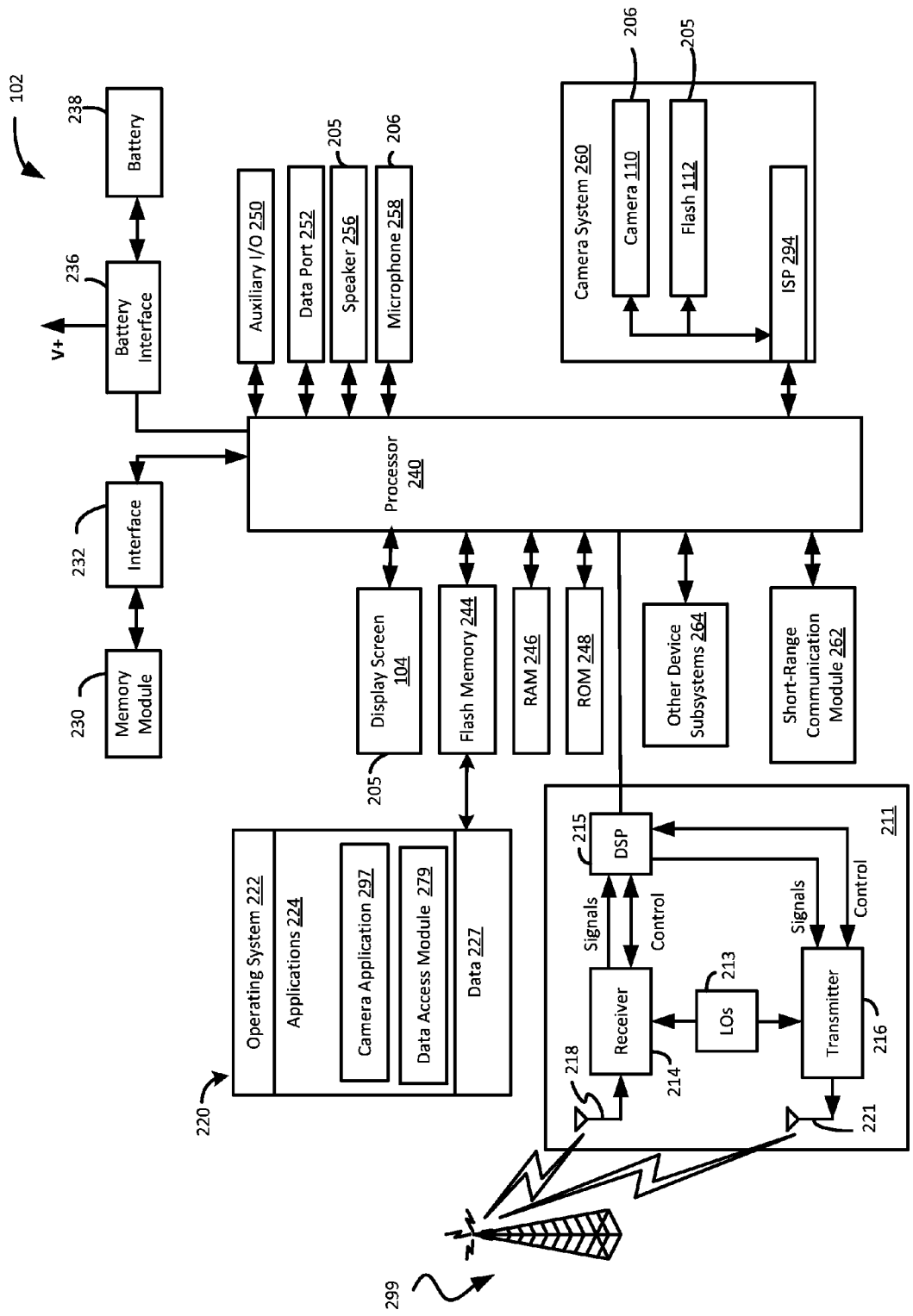
FIG. 2 is a block diagram illustrating components of the example electronic device of FIG. 1 in accordance with example embodiments of the present disclosure; and, FIG. 3 is a flow-chart depicting a method of merging a first set of data objects and a second set of data objects for displaying on a display screen.

Referring now to FIG. 2, a block diagram of an example electronic device 102 is illustrated. The electronic device 102 of FIG. 3 may include a housing that houses components of the electronic device 102. Internal components of the electronic device 102 may be constructed on a printed circuit board (PCB). The electronic device 102 includes a controller including at least one processor 240 (such as a microprocessor) that controls the overall operation of the electronic device 102. The processor 240 interacts with device subsystems such as a wireless communication subsystem 211 for exchanging radio frequency signals with a wireless network 299 to perform communication functions. The processor 240 interacts with additional device subsystems including one or more input interfaces 206 (such as a keyboard, one or more control buttons, one or more microphones 258, one or more cameras 110, and/or a touch-sensitive overlay associated with a touchscreen display), flash memory 244, random access memory (RAM) 246, read only memory (ROM) 248, auxiliary input/output (I/O) subsystems 250, a data port 252 (which may be a serial data port, such as a Universal Serial Bus (USB) data port), one or more output interfaces 205 (such as a display screen 104 (which may be a liquid crystal display (LCD)), a flash 112, one or more speakers 256, or other output interfaces), a short range communication module 262, and other device subsystems generally designated as 264. Some of the subsystems shown in FIG. 2 perform communication-related functions, whereas other subsystems may provide "resident" or on-device functions.

The electronic device 102 may include a touchscreen display in some example embodiments. The touchscreen display may be constructed using a touch-sensitive input surface connected to an electronic controller. The touch-sensitive input surface overlays the display screen 104 and may be referred to as a touch-sensitive overlay. The touch-sensitive overlay and the electronic controller provide a touch-sensitive input interface 206 and the processor 240 interacts with the touch-sensitive overlay via the electronic controller. That is, the touchscreen display acts as both an input interface 206 and an output interface 205.

The communication subsystem 211 includes a receiver 214, a transmitter 216, and associated components, such as one or more antenna elements 218 and 221, local oscillators (LOs) 213, and a processing module such as a digital signal processor (DSP) 215. The antenna elements 218 and 221 may be embedded or internal to the electronic device 102 and a single antenna may be shared by both receiver 214 and transmitter 216, as is known in the art. The particular design of the wireless communication subsystem 211 depends on the wireless network 299 in which the electronic device 102 is intended to operate.

The electronic device 102 may communicate with any one of a plurality of fixed transceiver base stations of the wireless network 299 within its geographic coverage area. The electronic device 102 may send and receive communication signals over the wireless network 299 after the required network registration or activation procedures have been completed. Signals received by the antenna 218 through the wireless network 299 are input to the receiver 214, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 215. In a similar manner, signals to be transmitted are processed, including modulation and encoding, for example, by the DSP 215. These DSP-processed signals are input to the transmitter 216 for digital-to-analog (D/A) conversion, frequency up conversion, filtering, amplification, and transmission to the wireless network 299 via the antenna 221. The DSP 215 not only processes communication signals, but may also provide for receiver and transmitter control. For example, the gains applied to communication signals in the receiver 214 and the transmitter 216 may be adaptively controlled through automatic gain control algorithms implemented in the DSP 215.

In some example embodiments, the auxiliary input/output (I/O) subsystems 250 may include an external communication link or interface, for example, an Ethernet connection. The electronic device 102 may include other wireless communication interfaces for communicating with other types of wireless networks; for example, a wireless network such as an orthogonal frequency division multiplexed (OFDM) network.

In some example embodiments, the electronic device 102 also includes a removable memory module 230 (typically including flash memory) and a memory module interface 232. Network access may be associated with a subscriber or user of the electronic device 102 via the memory module 230, which may be a Subscriber Identity Module (SIM) card for use in a GSM network or other type of memory module for use in the relevant wireless network type. The memory module 230 may be inserted in or connected to the memory module interface 232 of the electronic device 102.

The electronic device 102 may store data 227 in an erasable persistent memory, which in one example embodiment is the flash memory 244. In various example embodiments, the data 227 may include service data having information required by the electronic device 102 to establish and maintain communication with the wireless network 299. The data 227 may also include user application data such as email messages, address book and contact information, calendar and schedule information, notepad documents, images, video, audio, and other commonly stored user information stored on the electronic device 102 by its user, and other data. The data 227 may also include data captured using the camera 110. The data 227 may, in at least some embodiments, include metadata which may store information about the images or video. In some embodiments the metadata and the images may be stored together. That is, a single file may include both an image and also metadata regarding that image. For example, in at least some embodiments, the image may be formatted and stored as a JPEG image.

Individual data files may be identified as data objects. Collections or groupings of data objects may be identified as data sets or as sets of data objects. Data objects may be grouped into a set of data objects by storing an association or an identification of the data objects in memory, for example.

The data 227 stored in the persistent memory (e.g. flash memory 244) of the electronic device 102 may be organized, at least partially, into a number of databases or data stores each containing data items of the same data type or associated with the same application. For example, email messages, contact records, and task items may be stored in individual databases within the electronic device 102 memory.

The data port 252 may be used for synchronization with a user's host computer system. The data port 252 enables a user to set preferences through an external device or software application and extends the capabilities of the electronic device 102 by providing for information or software downloads to the electronic device 102 other than through the wireless network 299. The alternate download path may for example, be used to load an encryption key onto the electronic device 102 through a direct, reliable and trusted connection to thereby provide secure device communication.

In some example embodiments, the electronic device 102 is provided with a service routing application programming interface (API) which provides an application with the ability to route traffic through a serial data (i.e., USB) or Bluetooth® (Bluetooth® is a registered trademark of Bluetooth SIG, Inc.) connection to the host computer system using standard connectivity protocols. When a user connects their electronic device 102 to the host computer system via a USB cable or Bluetooth® connection, traffic that was destined for the wireless network 299 is automatically routed to the electronic device 102 using the USB cable or Bluetooth® connection. Similarly, any traffic destined for the wireless network 299 is automatically sent over the USB cable Bluetooth® connection to the host computer for processing. Further, data may be transmitted to and from the electronic device 102 using a WiFi network or using near field communication technologies.

The electronic device 102 also includes a battery 238 as a power source, which is typically one or more rechargeable batteries that may be charged, for example, through charging circuitry coupled to a battery interface 236 such as the serial data port 252. The battery 238 provides electrical power to at least some of the electrical circuitry in the electronic device 102, and the battery interface 236 provides a mechanical and electrical connection for the battery 238. The battery interface 236 is coupled to a regulator (not shown) which provides power V+ to the circuitry of the electronic device 102.

The short range communication module 262 provides for communication between the electronic device 102 and different systems or devices, which need not necessarily be similar devices. For example, the short range communication module 262 may include an infrared device and associated circuits and components, or a wireless bus protocol compliant communication mechanism such as a Bluetooth® communication module to provide for communication with similarly-enabled systems and devices.

In the embodiment illustrated, the camera 110 is included in a camera system 260 along with a flash 112, and an image signal processor (ISP) 294. The ISP 294 may be embedded in the processor 240 and it may also be considered as a functional part of the camera system 260. In at least some embodiments, the camera 110 may be associated with a dedicated image signal processor 294 which may provide at least some camera-related functions, with the image signal processor 294 being either embedded in the camera 110 or a separate device. For example, in at least some embodiments, the image signal processor 294 may be configured to provide auto-focusing functions. Functions or features which are described below with reference to the camera application 297 may, in at least some embodiments, be provided, in whole or in part, by the image signal processor 294.

The camera system 260 associated with the electronic device 102 also includes a flash 112. As noted above, the flash 112 is used to illuminate a subject while the camera 110 captures an image of the subject. The flash 112 may, for example, be used in low light conditions. In the example embodiment illustrated, the flash 112 is coupled with the main processor 240 of the electronic device 102. The flash 112 may be coupled to the image signal processor 294, which may be used to trigger the flash 112. The image signal processor 294 may, in at least some embodiments, control the flash 112. In at least some such embodiments, applications associated with the main processor 240 may be permitted to trigger the flash 112 by providing an instruction to the image signal processor 294 to instruct the image signal processor 294 to trigger the flash 112. In one or more embodiments, the image signal processor 294 may be coupled to the processor 240.

In one or more embodiments, the camera system 260 may have a separate memory (not shown) on which the image signal processor 294 can store data and retrieve instructions. Such instructions may, for example, have been stored in the memory by the processor 240, which may in some embodiments also be coupled to the separate memory in the camera system 260.

A predetermined set of applications that control basic device operations, including data and possibly voice communication applications may be installed on the electronic device 102 during or after manufacture. Additional applications and/or upgrades to an operating system 222 or software applications 224 may also be loaded onto the electronic device 102 through the wireless network 299, the auxiliary I/O subsystem 250, the data port 252, the short range communication module 262, or other suitable device subsystems 264. The downloaded programs or code modules may be permanently installed; for example, written into the program memory (e.g. the flash memory 244), or written into and executed from the RAM 246 for execution by the processor 240 at runtime.

In some example embodiments, the electronic device 102 may provide two principal modes of communication: a data communication mode and a voice communication mode. In the data communication mode, a received data signal such as a text message, an email message, or webpage download will be processed by the communication subsystem 211 and input to the processor 240 for further processing. For example, a downloaded webpage may be further processed by a web browser or an email message may be processed by the email messaging application and output to the display screen 104. A user of the electronic device 102 may also compose data items, such as email messages; for example, using an input interface 206 in conjunction with the display screen 104. These composed items may be transmitted through the communication subsystem 211 over the wireless network 299.

In the voice communication mode, the electronic device 102 provides telephony functions and may operate as a typical cellular phone. The overall operation is similar to the data communication mode, except that the received signals would be output to the speaker 256 and signals for transmission would be generated by a transducer such as the microphone 258. The telephony functions are provided by a combination of software/firmware (i.e., a voice communication module) and hardware (i.e., the microphone 258, the speaker 256 and input devices). Alternative voice or audio I/O subsystems, such as a voice message recording subsystem, may also be implemented on the electronic device 102. Although voice or audio signal output may be accomplished primarily through the speaker 256, the display screen 104 may also be used to provide an indication of the identity of a calling party, duration of a voice call, or other voice call related information.

The processor 240 operates under stored program control and executes software modules 220, such as applications 224, stored in memory such as persistent memory; for example, in the flash memory 244. As illustrated in FIG. 2, the software modules 220 may include operating system software 222 and one or more additional applications 224 or modules such as, for example, a camera application 297. The processor 240 may also operate to process data 227 stored in memory associated with the electronic device 102.

In the example embodiment of FIG. 2, the camera application 297 is illustrated as being implemented as a standalone application 224. However, in other example embodiments, the camera application 297 could be provided by another application or module such as, for example, the operating system software 222. Further, while the camera application 297 is illustrated with a single block, the functions or features provided by the camera application 297 could, in at least some embodiments, be divided up and implemented by a plurality of applications and/or modules. In one or more embodiments, the camera application 297 can be implemented by the ISP 294. The camera application 297 may, for example, be configured to provide a viewfinder on the display screen 104 by displaying, in real time or near real time, an image defined in the electronic signals received from the camera 110. The camera application 297 may also be configured to capture an image or video by storing an image or video defined by the electronic signals received from the camera 110 and processed by the image signal processor 294. For example, the camera application 297 may be configured to store an image or video to memory of the electronic device 102. The camera application 297 may also be configured to control options or preferences associated with the camera 110.

In at least some embodiments, the camera application 297 may be configured to control a flash associated with the camera 110 and/or to control a zoom associated with the camera 110.

The software modules 220 may also include a data access module 279. The data access module 279 may be configured to control the access to the data 227 or data objects. For example, the data access module 279 may be controlled by the processor 240 and may be able to retrieve data from one or more memory locations.

In one or more embodiments, the data access module 279 may be configured to access data objects or data 227 that is stored in two separate memory locations. For example, the data access module 279 may be able to access data from a first memory location and a second memory location. The first memory location may be separate from the second memory location. For example, the first memory location may be a removable memory module 230 and the second memory location may be a ROM 248. The data access module 279 may also be configured to group together data objects obtained from the two memory locations in accordance with the methods described below.

The software modules 220 or parts thereof may be temporarily loaded into volatile memory such as RAM 246. The RAM 246 is used for storing runtime data variables and other types of data or information. Although specific functions are described for various types of memory, this is merely one example, and a different assignment of functions to types of memory could also be used.

Exemplary Method of Merging Data Objects

Figure 3:
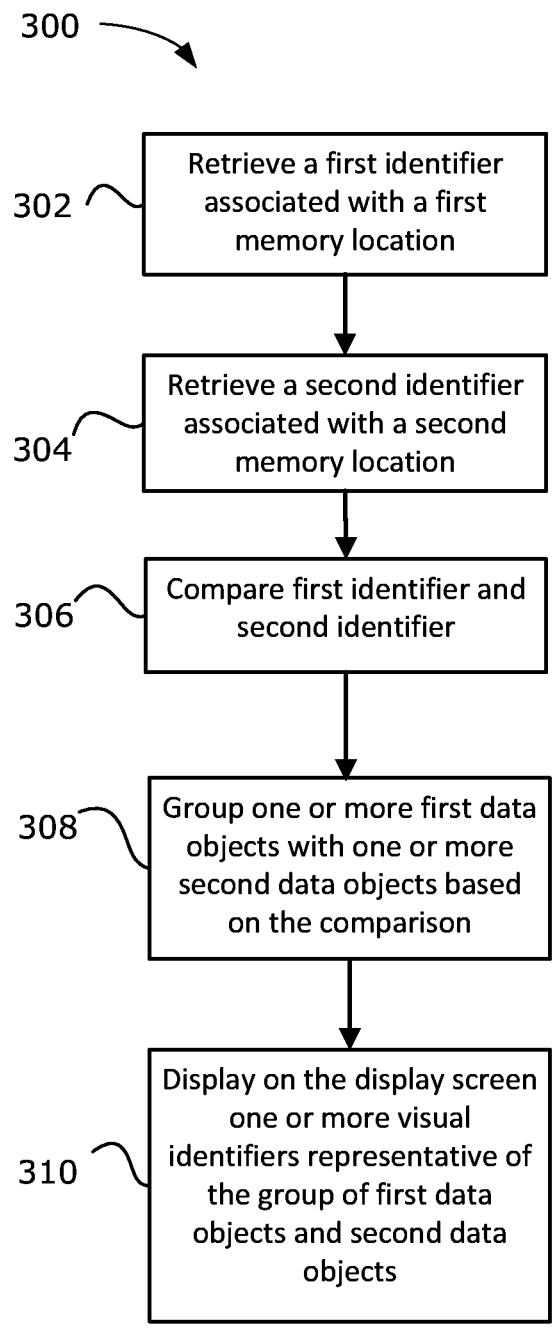

FIG. 3 is a flowchart depicting a method 300 of merging a first set of data objects and a second set of data objects for displaying on a display screen 104. A set of data objects (including a first set of data objects and a second set of data objects) can include one or more data objects. For example, the first set of data objects can include one or more first data objects and the second set of data objects can include one or more second data objects. The display screen 104 can be on an electronic device 102 such as the electronic device 102 described in relation to FIGS. 1 and 2. The method 300 can be carried out by a processor executing instructions stored on a memory. In an alternative embodiment, the display screen can be a display screen on a desktop computer, television, tablet computer, or other electronic device 102. The method 300 may be carried out by the data access module 279, which may be operating on instructions from the processor 240.

At 302, a first identifier associated with a first memory location is retrieved. The first memory location may be the flash memory 244, or ROM 248 or another memory that can be associated with the electronic device 102. For example, the first memory location may be a removable memory or may be a remote memory accessible to the electronic device 102 over a network. By way of further example, the first memory location can be a memory that is internal to the electronic device 102.

In accordance with an embodiment, the first memory location is for storing the first set of data objects. The first set of data object includes one or more first data objects. One or more of the first data objects can be an image file. For example, one or more of the first data objects can be a file in .jpg or .tiff formats. One or more of the first data objects can be an audio file, such as a file stored in .mp3 format. One or more of the first data objects can be a video file. One or more of the first data objects can be in another file format, such as a text based file, an HTML file, etc. In other embodiment, the first data object can be any type of digital file or any object with digital contents that can be stored in a memory.

In one or more embodiments, the first memory location is organized as a hierarchical file system. For example, the memory may be subdivided into folders, which themselves may be subdivided into folders. The first data objects may be contained or accessible through one or more of the sub-folders. The sub-folders of a parent folder may be accessible only through the parent folder.

In one or more embodiments, the hierarchical file system can be displayed on the display screen 104 in response to an instruction or input. Each individual folder or level in the hierarchy can be accesses or selected in order to view its contents. Each folder has a name or identifier, and the present folder's name is the "basename". In other words, the folder that is the lowest current level may have a name that is referenced as the "basename" herein. The parent or parent directory can be the terms used to identify the immediately preceding folder or immediately preceding level in the file hierarchy. The immediately preceding folder in the hierarchy can be the folder that is immediately preceding the basename folder. The full path can be the term used to identify the entire path name (e.g. with the name of all of the folders, such as C:/files/photos/vacation/). Using the same example, the basename folder is "vacation/" and the parent directory name is "photos/".

In one or more embodiments, the first set of data objects can include one or more file folders. For example, the first set of data objects can include one or more file folders and one or more data objects that are not file folders.

In one or more embodiments, the first data objects that are included in the first set of data objects may be all of the same format or type. Alternatively, one or more of the first data objects that are in the first set of data objects is of a different format or type from the others.

In one or more embodiments, the set of first data objects contains one or more (or all) of the data objects in a specific folder. For example, the first set of data objects can be all of the contents of the folder C:/files/photos/vacation/, which may include image files and subfolders, for example.

At 304, a second identifier associated with a second memory location is retrieved. The second memory location is for storing the second set of data objects. The second memory location may be the flash memory 244, or ROM 248 or another memory that can be associated with the electronic device 102. For example, the second memory location may be a removable memory (such as the memory module 230) or may be a remote memory accessible to the electronic device 102 over a network. By way of further example, the second memory location can be a memory that is internal to the electronic device 102.

In accordance with an embodiment, the second memory location is for storing the second set of data objects. The second set of data object includes one or more second data objects. One or more of the second data objects can be an image file. For example, one or more of the second data objects can be a file in .jpg or .tiff formats. One or more of the second data objects can be an audio file, such as a file stored in .mp3 format. One or more of the second data objects can be a video file. One or more of the second data objects can be in another file format, such as a text based file, an HTML file, etc.

In one or more embodiments, the second memory location is organized as a hierarchical file system. For example, the memory may be subdivided into folders, which themselves may be subdivided into folders. The second data objects may be contained or accessible through one or more of the sub-folders. The sub-folders of a parent folder may be accessible only through the parent folder.

In one or more embodiments, the second set of data objects can include one or more file folders.

In one or more embodiments, the second data objects that are included in the second set of data objects may be all in the same format or type. Alternatively, one or more of the second data objects that are in the second set of data objects is of a different format or type from the others. In one or more embodiments, the second data objects may be in a different format or type than the first data objects.

In one or more embodiments, the set of second data objects contains one or more (or all) of the data objects in a specific folder. For example, the second set of data objects can be all of the contents of the folder C:/files/photos/vacation/, which may include image files and subfolders, for example.

In one or more embodiments, both the first memory location and the second memory location are organized as hierarchical file systems. In an alternative embodiment only one of the first memory location and the second memory location is organized as a hierarchical file system. In yet a further alternative embodiment, none of the first memory location and second memory location are organized as a hierarchical file system.

In one or more embodiments, the first identifier is a first basename and the second identifier is a second basename. The first basename can be the name of the folder that directly contains the first data objects and the second basename can be the name of the folder that directly contains the second data objects. A folder directly contains a data object if there are no sub-folders between the folder and the data object.

The first memory location may be part of the same physical memory as the second memory location but with each of the first memory location and second memory location having a different path name. For example, each of the first memory location and the second memory location may be located in a memory internal to the electronic device 102 which may be organized as a hierarchical file system (or hierarchical memory). Following the same example, each of the first memory location and second memory location may be different folders in the hierarchy and as a consequence each of the first memory location and second memory location may be on a different path in the hierarchy.

In one or more embodiments, the first identifier includes a name of a parent directory associated with the first basename and the second identifier includes a name of a parent directory associated with the second base name. For example, the first identifier can be the string of words that contain the basename (i.e. the name of the folder that directly contains the first data objects) and the name of the parent folder (e.g. "photos/vacation/"). Similarly, the second identifier can be the string of words that contain the basename and the name of the parent folder of the basename.

In one or more embodiments, retrieving the first identifier includes removing a root portion of a path name associated with the first memory location and wherein retrieving the second identifier includes removing a root portion of a path name associated with the second memory location. Each of the first memory location and the second memory location may be identified using a path name, which can include both a root portion and the names of the folders in the path name. For example, the retrieval of the first identifier may consist of retrieving the entire path name for the first memory location and then stripping away the root portion and/or names of one or more of the folders in the path name. For example, the path name for the first memory location may be "C:/files/photos/vacation/", and after stripping away or removing the root portion the first identifier may be "files/photos/vacation/". By way of further example, the retrieval of the first identifier may also include stripping away one or more of the folder names so that, following the example, the first identifier may be "vacation/".

Retrieving the first identifier can include stripping away the system defined portion of the path name for the first memory location to leave the (or part of the) user-defined portion of the path name for the first memory location. Similarly, retrieving the second identifier can include stripping away the system defined portion of the path name associated the second memory location to leave the (or part of the) user-defined portion of the path name associated with the second memory location. The system defined portion may consist of the root directory of the respective memory location and the user defined portion may consist of the folder names for the folders (or directories) of the respective memory location.

In one or more embodiments, the first memory location and the second memory location are on different memory components. For example, the first memory location may be located on a memory component that is physically separate from the memory component that the second memory location is located on. In other words, the data (e.g. first data objects) stored in or at the first memory location are stored on a memory component that is different from the memory component on which the second data objects are stored. Accordingly, the root of the path name of the first memory location can be different from the root of the path name of the second memory location component. In one or more embodiments, the roots of the path names may be stripped from the names of the first memory location and second memory location in order to retrieve the first identifier and the second identifier. For example, the first identifier and the second identifier may be the relative path names.

In one or more embodiments, the first memory location is associated with (or is located on) an internal memory component and the second memory location is associated with (or is located on) an external memory component. The external memory component can be a removable memory such as a flash memory 244, a DVD, or CD for example. The internal memory can be ROM 248 for example. In a further embodiment, the external memory component can be a remotely accessible memory. For example, the second memory location may be located on a memory component that is remote from the electronic device 102 which is accessible over a network (such as a wireless network).

At 306, the first identifier and the second identifier are compared. For example, the processor 240 can compare the characters in the first identifier with the characters in the second identifier. By way of further example, there may be certain features associated with the first identifier and second identifier that can be compared. By way of further example, the features can include the type and/or location of the first memory location and the second memory location.

The comparison of the first identifier and the second identifier can include comparing whether the user defined portion of each path name (which may be the first identifier and the second identifier) are the same or match.

In one or more embodiments, the first identifier and the second identifier are both portions of path names rather than entire path names. For example, the first identifier and the second identifier may both be a basename or may both be only the user-defined portion of the path name (where the entire path name is the name of the first memory location or the second memory location respectively).

In one or more embodiments, the comparison of the first identifier and the second identifier includes determining whether the first identifier and the second identifier match. For example, the processor 240 may do a character by character analysis of each of the first identifier and the second identifier in order to determine whether each character and character position in each of the first identifier and second identifier match.

In an alternative embodiment, the comparison of the first identifier and the second identifier can include determining whether more than a predefined percentage of characters in each of the first identifier and second identifier match. For example, the predefined percentage may be 75% so that in order to determine a match, 75% of the characters in the first identifier and the second identifier must be the same and in the same position.

In another embodiment, the comparison of the first identifier and the second identifier can include determining whether the first predetermined number of characters in the first identifier and second identifier match. For example, using a predetermined number of 4 characters, to determine that there is a match, the first 4 characters in the first identifier must match the first 4 characters in the second identifier.

At 308, one or more first data objects from the first set of data objects and one or more second data objects from the second set of data objects are grouped based on the comparison. In other words, in response to comparing the first identifier and the second identifier, a group of one or more of the second data objects and one or more of the first data objects is formed.

In one or more embodiments, grouping one or more first data objects and one or more second data objects based on the comparison includes associating the one or more first data objects with one or more second data objects in a memory associated with the electronic device 102. For example, the association of the first data objects and second data objects in a group may include listing each of the first data objects (i.e. the names of the first data objects) with the second data objects (i.e. the names of the second data objects) in a single list in a file with a notification that they are to be grouped.

In one or more embodiments, the grouped one or more first data objects and one or more second data objects may be stored in a specific location in a memory that is associated with the electronic device 102. For example, grouping the one or more first data objects and the one or more second data objects may include copying the data objects into a specific location in a memory associated with the electronic device 102. Alternatively, a list identifying the grouped first data objects and second data objects along with the location of the first data objects and second data objects may be stored in a memory accessible to the electronic device 102.

Optionally, at 310, one or more visual identifiers 114 representative of the group of one or more first data objects and one or more second data objects are displayed on the display screen 104. In one or more embodiments, each of the one or more first data object and the one or more second data object in the group is associated with a unique visual identifier 114. For example, the visual identifiers 114 can each be icons that are representative of the associated or underlying first data object or second data object.

The visual identifiers 114 can be visually related to the underlying first data object or second data object. For example, the underlying data object can be an image file and the visual identifier for that data object can be a small version (e.g. a thumbnail) of the image file.

In one or more embodiments, displaying the visual identifiers 114 can include displaying the visual identifiers 114 in chronological order. For example, the data objects (e.g. the first data object or second data object) underlying each visual identifier 114 can have an associated date (or time), such as a last accessed date, created date or last edited date. The date associated with the visual identifiers 114 (or with the underlying data object), can be used as a basis for ordering the display of the visual identifiers 114 on the display screen 104. For example, the visual identifier 114 with the oldest associated date can be displayed in a first position, the display of the visual identifier 114 with the second oldest date can be displayed in a second position, and so on. The positioning of the displayed visual identifiers 114 can be from left to right and from top to bottom (similar to the ordering of written text).

In one or more embodiments, grouping the one or more first data objects and the one or more second data objects may include storing the visual identifiers 114 associated with the one or more first data objects and the one or more second data objects in a location in a memory associated with the electronic device 102. The visual identifiers 114 may then be accessed from the memory and displayed on the display screen 104.

A visual identifier 114 shown on the display screen 104 may be selected using an input interface (e.g. a touch on a touchscreen surface or a point and click input). In response to being selected, the data object underlying the selected visual identifier 114 may be open, launched or initiated. For example, the selected visual identifier 114 may be associated with an image file, and when the visual identifier 114 is selected the underlying image file may be displayed on the display screen 104. Similarly, the selected visual identifier 114 may be associated with a video file, and when the visual identifier 114 is selected the video file may be launched. In yet a further example, the selected visual identifier 114 may be associated with a file folder in a hierarchical file system, and when the visual identifier 114 is selected the contents of the file folder may be displayed on the display screen 104. In other words, a list of files or of icons (or further visual identifiers 114) representing the contents of the file folder may be displayed on the display screen 104.

The visual identifiers 114 that are displayed on the display screen 104 may include some visual identifiers 114 that are associated with first data objects and second data objects. For example, when the visual identifiers 114 are displayed on the display screen 104 they may be displayed without regard to whether the underlying data object is a first data object or a second data object.

The term "computer readable medium" or "computer readable storage medium" or "computer readable memory" as used herein means any medium which can store instructions for use by or execution by a computer or other computing device including but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile Disc (DVD) or Blu-ray™ Disc, and a solid state storage device (e.g., NAND flash or synchronous dynamic RAM (SDRAM)).

One or more embodiments have been described by way of example. It will be apparent to persons skilled in the art that a number of variations and modifications can be made without departing from the scope of what is defined in the claims.

What is claimed is:

1. A method of merging a first set of data objects and a second set of data objects for displaying on a display screen, the method comprising:
   determining a first full path associated with a first memory location, the first memory location for storing the first set of data objects;
   determining a second full path associated with a second memory location, the second memory location for storing the second set of data objects;
   retrieving a first identifier based on the first full path, the retrieving comprises removing at least one or more system defined folder names in the first full path to provide a first user defined folder path, wherein the first identifier comprises a lowest level user defined folder name in the first user defined folder path;
   retrieving a second identifier based on the second full path, the retrieving comprises removing at least one or more system defined folder names in the second full path to provide a second user defined folder path, wherein the second identifier comprises a lowest level user defined folder name in the second user defined folder path;

comparing the first identifier and the second identifier;

grouping one or more first data objects from the first set of data objects and one or more second data objects from the second set of data objects based on the comparison; and displaying on the display screen one or more visual identifiers representative of one or more first data objects associated with the first memory location and one or more second data objects associated with the second memory location.

2. The method of claim 1, wherein comparing the first identifier and the second identifier comprises determining that the first identifier and the second identifier match.

3. The method of claim 2, wherein grouping one or more first data objects and one or more second data objects based on the comparison comprises associating the one or more first data objects with one or more second data objects in a memory.

4. The method of claim 1, wherein the one or more first data objects and the one or more second data objects comprise one of image files, audio files and video files.

5. The method of claim 4, wherein displaying comprises displaying the visual identifiers in chronological order.

6. The method of claim 1, wherein the first memory location and the second memory location are organized as hierarchical files systems.

7. The method of claim 6, wherein a first basename is the lowest level user defined folder name in the first user defined folder path, and wherein a second basename is the lowest level user defined folder name in the second user defined folder path, and wherein the first identifier further comprises a name of a parent directory associated with the first basename, and wherein the second identifier further comprises a name of a parent directory associated with the second basename.

8. The method of claim 1, wherein first memory location and second memory location are on different memory components.

9. The method of claim 8, wherein the first memory location is associated with an internal memory component and the second memory location is associated with an external memory component.

10. The method of claim 1, wherein comparing the first identifier and the second identifier comprises determining whether the first identifier and the second identifier are sufficiently similar to one another by comparing a metric of their similarity to a threshold, and wherein the grouping is performed when the first identifier and the second identifier are determined to be sufficiently similar.

11. The method of claim 10, wherein the metric of similarity is a percentage of characters in the first identifier that match characters in the second identifier.

12. The method of claim 10, wherein the metric of similarity is a number of characters in the first identifier that match characters in the second identifier.

13. An electronic device comprising:
a first memory location for storing a first set of data objects;
a second memory location for storing a second set of data objects;
a processor for executing instructions; and
a memory for storing the instructions, which when executed cause the processor to:

determine a first full path associated with the first memory location;

determine a second full path associated with the second memory location;

retrieve a first identifier based on the first full path, the retrieving comprises removing at least one or more system defined folder names in the first full path to provide a first user defined folder path, wherein the first identifier comprises a lowest level user defined folder name in the first user defined folder path;

retrieve a second identifier based on the second full path, the retrieving comprises removing at least one or more system defined folder names in the second full path to provide a second user defined folder path, wherein the second identifier comprises a lowest level user defined folder name in the second user defined folder path;

compare the first identifier and the second identifier;

group one or more first data objects from the first set of data objects and one or more second data objects from the second set of data objects based on the comparison; and display on a display screen one or more visual identifiers representative of one or more first data objects associated with the first memory location and one or more second data objects associated with the second memory location.

14. The electronic device of claim 13, wherein the one or more first data objects and the one or more second data objects comprise one of image files, audio files and video files.

15. The electronic device of claim 13, wherein the first memory location and the second memory location are organized as hierarchical file systems.

16. The electronic device of claim 13, wherein the first memory location and the second memory location are on different memory components.

17. The electronic device of claim 16, wherein the first memory location is associated with an internal memory component and the second memory location is associated with an external memory component.

18. A non-transitory computer readable memory comprising computer-executable instructions which, when executed, cause a processor to:

determine a first full path associated with a first memory location, the first memory location for storing the first set of data objects;

determine a second full path associated with a second memory location, the second memory location for storing the second set of data objects;

retrieve a first identifier based on the first full path, the retrieving comprises removing at least one or more system defined folder names in the first full path to provide a first user defined folder path, wherein the first identifier comprises a lowest level user defined folder name in the first user defined folder path;

retrieve a second identifier based on the second full path, the retrieving comprises removing at least one or more system defined folder names in the second full path to provide a second user defined folder path, wherein the second identifier comprises a lowest level user defined folder name in the second user defined folder path;

compare the first identifier and the second identifier;

group one or more first data objects from the first set of data objects and one or more second data objects from the second set of data objects based on the comparison; and display on a display screen one or more visual identifiers representative of one or more first data objects associated with the first memory location and one or more second data objects associated with the second memory location.

\* \* \* \* \*